(12) United States Patent
Dagh et al.

(10) Patent No.: US 7,416,259 B2
(45) Date of Patent: Aug. 26, 2008

(54) ARRANGEMENT AND METHOD FOR MOUNTING A WHEEL CAP ON A VEHICLE

(75) Inventors: Ingemar Dagh, Göteborg (SE); Anders Trygg, Onsala (SE)

(73) Assignee: Volvo Lastvagner AB, Göteborg (SE)

( * ) Notice: Subject to any disclaimer, the term of this patent is extended or adjusted under 35 U.S.C. 154(b) by 0 days.

(21) Appl. No.: 11/277,281

(22) Filed: Mar. 23, 2006

(65) Prior Publication Data

US 2006/0158021 A1 Jul. 20, 2006

Related U.S. Application Data

(63) Continuation of application No. PCT/SE2004/001455, filed on Oct. 12, 2004.

(30) Foreign Application Priority Data

Oct. 17, 2003 (SE) .................................. 0302757

(51) Int. Cl.
*B60B 7/06* (2006.01)
(52) U.S. Cl. ............................ 301/37.376; 301/37.102; 301/37.31
(58) Field of Classification Search ............ 301/37.101, 301/37.102, 37.371, 37.306, 37.376, 108.4, 301/37.26, 37.106, 37.31, 37.34, 108.1
See application file for complete search history.

(56) References Cited

U.S. PATENT DOCUMENTS

| 4,083,606 | A |   | 4/1978  | Scruggs |
|-----------|---|---|---------|---------|
| 4,210,367 | A | * | 7/1980  | Spisak ..................... 301/37.34 |
| 4,295,685 | A | * | 10/1981 | Spisak ..................... 301/37.42 |
| 4,787,681 | A | * | 11/1988 | Wang et al. ............ 301/37.372 |
| 4,946,228 | A | * | 8/1990  | Hsu et al. .............. 301/37.376 |
| 4,971,396 | A | * | 11/1990 | Morris .................. 301/37.376 |
| 5,150,949 | A |   | 9/1992  | Wang |
| 5,443,582 | A | * | 8/1995  | Ching ................... 301/37.376 |
| 5,542,750 | A | * | 8/1996  | FitzGerald ............ 301/37.376 |
| 5,695,257 | A |   | 12/1997 | Wright et al. |
| 5,853,228 | A | * | 12/1998 | Patti et al. ............. 301/37.371 |
| 6,238,007 | B1| * | 5/2001  | Wieczorek et al. ....... 301/37.31 |
| 6,698,846 | B2| * | 3/2004  | Ruspa .................... 301/108.4 |

FOREIGN PATENT DOCUMENTS

| FR | 2542671 A1 |   | 9/1984 |
| GB | 2224702    | * | 5/1990 |
| JP | 11059103 A |   | 3/1999 |

OTHER PUBLICATIONS

International Search Report from corresponding International Application PCT/SE2004/001455.

* cited by examiner

*Primary Examiner*—Russell D Stormer
(74) *Attorney, Agent, or Firm*—WRB-IP LLP (57) ABSTRACT

The invention relates to a method and an arrangement for mounting a wheel cap on a vehicle, the vehicle having rims with exposed fasteners for fastening to a wheel hub. The method includes mounting of a holder by fasteners of the rim, the holder having a first contact surface for resting against the rim and a second contact surface lying substantially parallel to and at a distance from the first contact surface, and where the mounting of the holder is done by at least two fasteners of the rims interacting with openings in the first contact surface of the holder. The method includes mounting of the wheel cap on the holder by a plurality of fasteners on the inner side of the wheel cap interacting with openings for the fasteners of the rim in the second contact surface of the holder.

11 Claims, 7 Drawing Sheets

ARRANGEMENT AND METHOD FOR MOUNTING A WHEEL CAP ON A VEHICLE

BACKGROUND AND SUMMARY

The present application is a continuation of International Application No. PCT/SE2004/001455, filed Oct. 12, 2004, which claims priority to SE 0302757-0, filed Oct. 17, 2003, both of which are incorporated by reference.

The invention relates to a method and an arrangement for quickly and easily mounting a wheel cap on a vehicle, the vehicle having rims with exposed fasteners for fastening the rim to a wheel hub.

There are nowadays many different ways of fastening wheel caps to rims for vehicles, such as trucks and buses, having exposed fasteners for fastening rims.

U.S. Pat. No. 5,542,750, for example, shows a fastening in which a wheel cap is fastened directly or indirectly to a rim at least together with an annular disc having openings for the wheel nuts. The wheel cap is here screwed securely into the disc. A disadvantage with this design is that the wheel cap cannot be removed without tools, and that it only provides a limited protection against external influences.

U.S. Pat. No. 5,167,440 shows a fastening in which a clamping ring is fitted to existing holes in the rim, it in turn being possible to screw the wheel cap securely to the clamping ring. This solution also requires tools for removing the wheel cap. Furthermore, it does not afford any protection against external influences.

The problems with these known fastenings are therefore that they cannot be removed quickly, since they require tools for detachment, and that they afford scant protection, if any, either for the surroundings or for wheel bolts or wheel nuts. The problems described above are resolved by a wheel cap fastening according to the invention.

It is desirable to provide an arrangement for quick and easy mounting of a wheel cap on a vehicle.

According to an aspect of the invention, a method is provided for mounting a wheel cap on a vehicle, the vehicle having rims with exposed fasteners for fastening to a wheel hub. The method comprises mounting of a holder by means of the rim fasteners, the holder having a first surface for resting against the rim, and mounting of the wheel cap on the holder, the holder having a second surface lying substantially parallel to and at a distance from the first surface.

The holder can be mounted in that fasteners of the rims interact with openings in the first surface of the holder. It is possible to have all rim fasteners interact with a corresponding number of openings in the first surface of the holder, but the holder may also be mounted by means of a smaller number of fasteners, such as at least three fasteners.

The wheel cap is mounted in that a number of fasteners arranged on the inner side of the wheel cap interact with openings on the second surface of the holder. Here the wheel cap fasteners can interact with at least two openings in the second surface of the holder, the number of openings corresponding to the number of rim fasteners. By making the number of openings in the second surface correspond to the number of rim fasteners it is possible to get to tighten and release these fasteners though the openings in the second surface.

According to a further aspect of the present invention, an arrangement for mounting a wheel cap on a vehicle is provided. The arrangement comprises a rim mounted on a wheel hub with a number of fasteners, a holder and a wheel cap. The holder may comprise a first surface, which may rest directly or indirectly against the rim and is fastened thereto, and a second surface lying in a plane substantially parallel to and at a distance from the first surface, the wheel cap being fastened to the second surface.

The holder may be formed with a first, inner surface and a second, outer surface, the surfaces having either the same shape or different shapes. The first surface may comprise, for example, a number of separate attachments, the contact surfaces of which against the rim constitute the first surface. Here the second surface may be circular or annular, with suitable inside and outside diameters. Alternatively, the first and second surface may have the same inside and outside diameter respectively and be joined to one another along the periphery of an inner or an outer edge of the respective surface. The holder is located against the outer side of the rim and at least the first, inner surface is therefore parallel to the rim. The second, outer surface is preferably parallel to the first surface but may be somewhat convexly or concavely conical. However, both the first and the second surface are arranged concentrically with the axis of rotation of the wheel. The distance between the first and the second surface is somewhat greater than the extent to which the wheel bolts or the wheel nuts protrude axially from the outer surface of the rim. The holder can thereby both protect persons and objects in the surroundings from the otherwise protruding wheel bolts, and protect the wheel bolts or nuts against damage caused by external influences. The outer part of the holder must also be designed to withstand forces acting parallel to the second surface, for example if the driver should use the holder as a step when the vehicle is parked in tight spaces.

The holder may be provided with openings in the first surface of the holder, the openings interacting with at least three fasteners of the rims. All rim fasteners can therefore be fitted in a corresponding number of openings in the first surface of the holder.

The wheel cap may be provided with a number of fasteners, which are preferably detachably secured in openings in the second surface of the holder. The fasteners interact with at least two openings in the second surface of the holder, the openings corresponding to the number of rim fasteners as specified above. Alternatively, the wheel cap may be fastened to a radially inner or outer edge of the second surface of the holder. The wheel cap fasteners suitably comprise snap couplings, such as clips or similar arrangements that permit rapid detachment of the wheel cap. An advantage with clips is that the fastening is less susceptible to damage and out-of-roundness of the outer surface. The fasteners may naturally also be fastened to the second surface of the holder for detachable fastening in openings in the inner surface of the wheel cap. The diameter of the wheel cap may be selected between a minimum diameter largely corresponding to the diameter of the second surface of the holder and a maximum diameter largely corresponding to the axially outer diameter of the rim.

BRIEF DESCRIPTION OF THE DRAWINGS

The invention will be described in more detail below with reference to exemplary embodiments shown in the schematic drawings attached, in which.

DETAILED DESCRIPTION

In the text below, unless otherwise stated, the terms "inner" and "outer" relate to the location of various components in relation to a rim mounted on a vehicle axle, marked X. The terms "axial" and "radial" consequently relate to a location or extent in relation to the central axis of the rim.

Figure 1A:
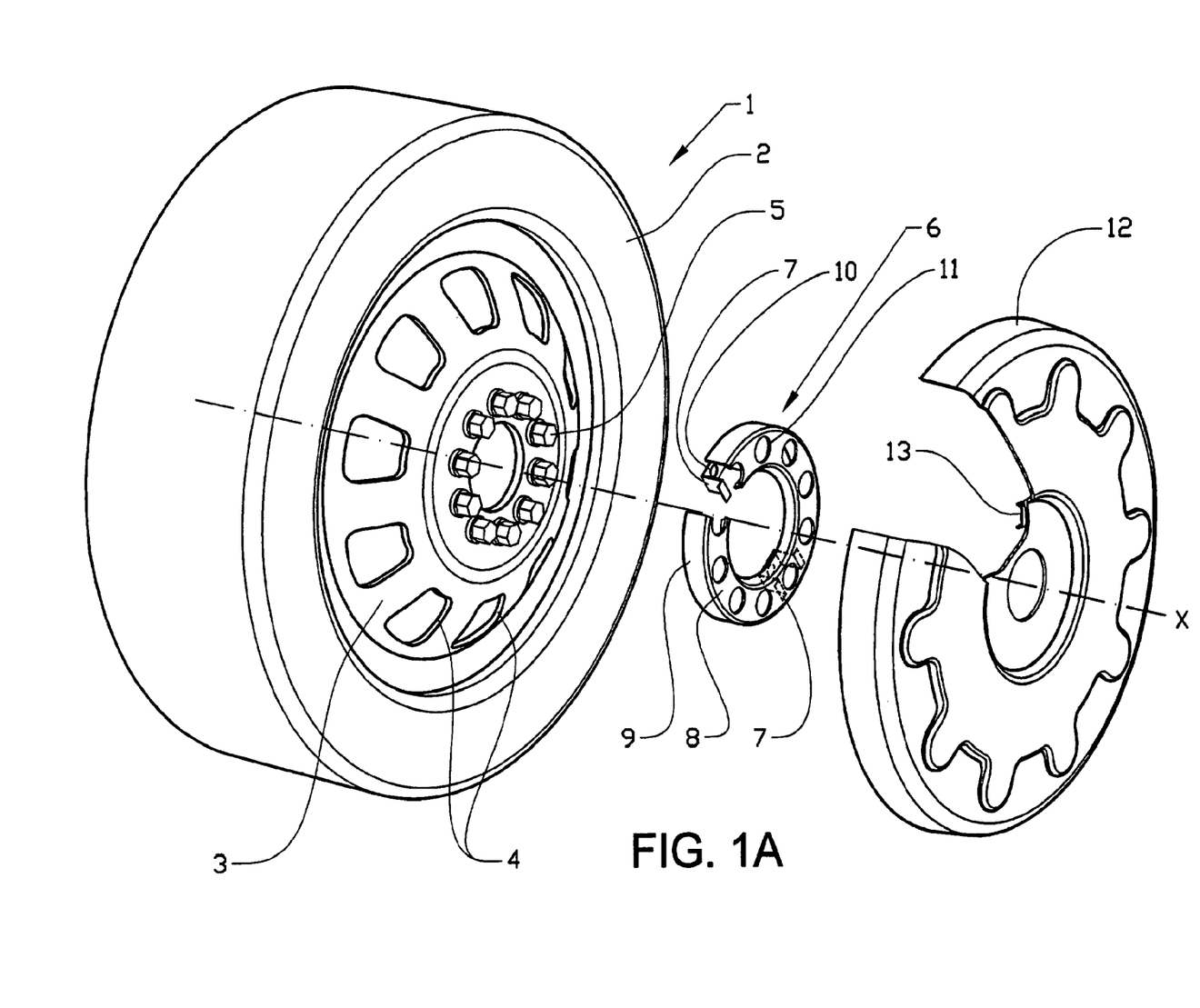
FIG. 1A shows a vehicle wheel having a wheel cap according to one embodiment of the invention.

FIG. 1A shows a vehicle wheel according to the invention, in this case a front wheel for a heavy truck or a bus. The wheel 1 comprises a tire 2, mounted on a rim 3, the rim being provided with a number of openings 4 and a central section having a number of holes (not shown) for wheel bolts 5 for mounting the wheel 1 on a wheel hub (not shown) with an axis of rotation X on the vehicle. When mounting the wheel 1, a holder 6 is placed against the rim 3 and is securely bolted by means of the wheel bolts 5. The holder 6 comprises attachments 7 having a pair of first contact surfaces 7', for resting against the rim 3, and a second contact surface 8, for resting against the wheel cap and located at an axial distance from the first contact surface 7'. The first contact surface 7 is designed as a bent plate having a cross section in the shape of a hat-shaped profile, ends 7" (see FIG. 2) of the profile being fastened to the second contact surface 8. The location and the design shape of the attachment 7 are illustrated by means of a section through the holder 6. The second contact surface is designed as an annular disc 8 having an outer peripheral edge 9, which is angled axially inwards in relation to the wheel axis X in order to provide further protection for the wheel bolts. For the same reasons the disc 8 may also be provided with a corresponding or somewhat smaller inner peripheral edge. The first contact surfaces 7' are each provided with a first hole 10, preferably corresponding in diameter to the wheel bolts 5, for fastening the holder 6 to the rim 3. The annular disc 8 is provided with a number of second holes 11, of which two holes are located concentrically with the first hole 10. The number of second holes 11 corresponds to the number of wheel bolts 5, but the holes have a larger diameter in order to allow access to the wheel bolts 5 with a box spanner or similar tool.

The holder 6 constitutes a fastening for a wheel cap 12, which has been endowed with a suitable design shape to match the diameter of the rim 3 and the axial extent thereof. On its inner surface the wheel cap 12 is provided with at least two, preferably five clips 13 for detachable mounting of the wheel cap 12 on the annular disc 8 of the holder 6. The clips 13 are fitted to the wheel cap 12 in order to permit interaction with a corresponding number of second holes 11 in the disc 8. The location of the clips is illustrated by means of a section through the wheel cap. The number of clips can be varied having regard to the adhesive force that is exerted on the holder by different types of clips.

The clips can be fastened to the wheel cap by screwing, riveting, adhesive bonding or spot-welding, depending on the material of the clips and the wheel cap. The clips can also be molded into the material if a plastic material is used in the wheel cap. The number of clips may vary from two up to a number corresponding to the number of wheel bolts, depending on the type of clip and the forces to which the wheel cap is likely to be exposed.

The figure shows the wheel cap with openings to reveal the clips, but it is naturally possible to make the wheel cap entirely plane. The latter design results in improved aerodynamic characteristics and/or less accumulation of dirt and the like in the holder and around the wheel bolts. The embodiment according to FIG. 1A shows wheel bolts, but fasteners in the form of wheel nuts are naturally also possible.

The holder is preferably made from sheet metal of a suitable metal and a suitable thickness and also provides the wheel bolts with protection against external influences.

Figure 1B:
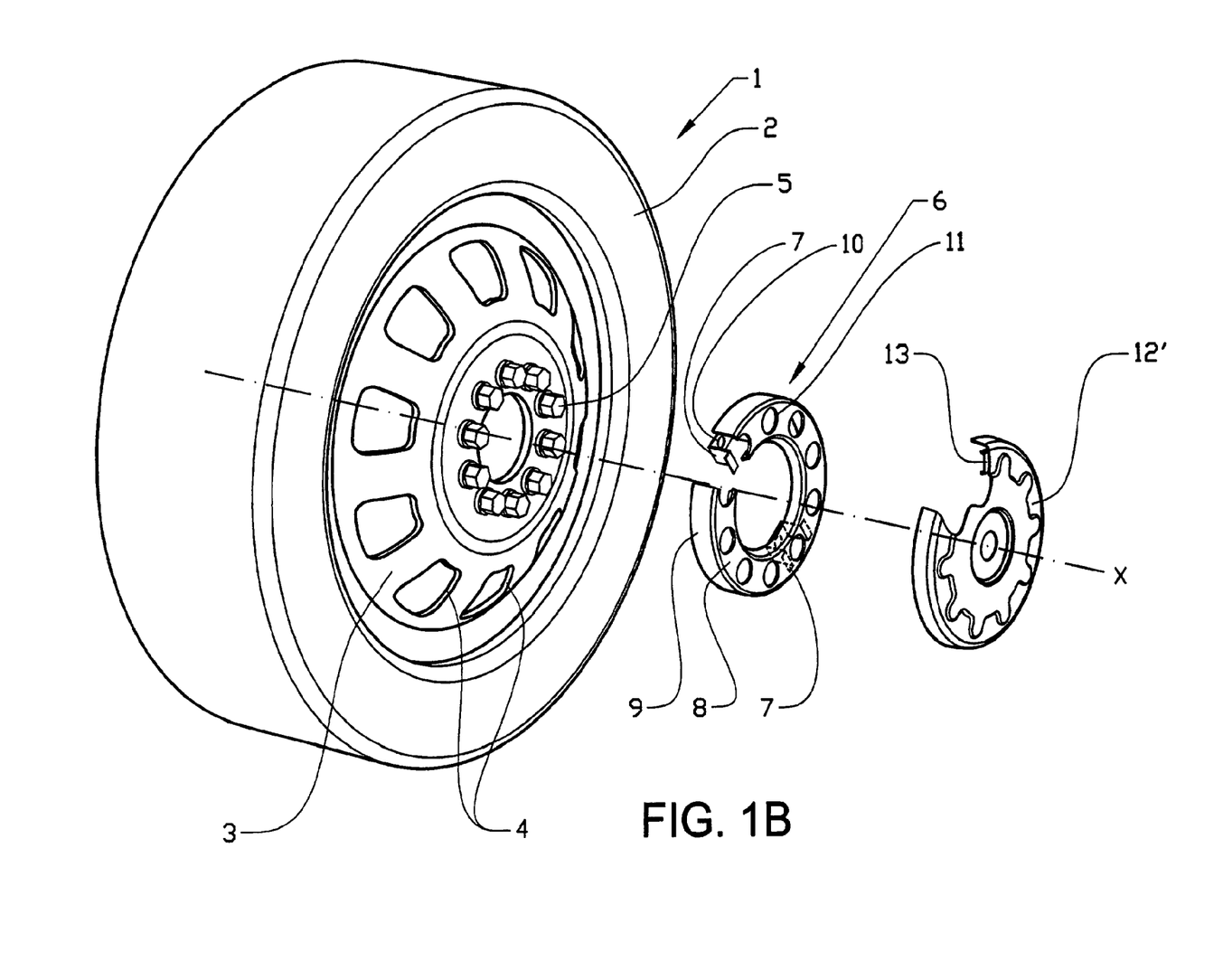
FIG. 1B shows a vehicle wheel having a wheel cap according to an alternative embodiment of the invention.

FIG. 1B shows an alternative embodiment of the wheel cap, in which a wheel cap 12 has been given a diameter only slightly larger than the diameter of the holder 6. Otherwise the holder 6 and the wheel cap 12' are mounted in the same way as described in connection with FIG. 1A. This embodiment means that a driver can use the wheel cap 12' as a foothold for climbing up into the cab, for example on a ferry when the door cannot be fully opened. The outer peripheral edge of the wheel cap will thereby come to rest against the outer peripheral edge 9 of the holder, which carries the load when the driver stands on the wheel cap 12'.

Figure 2:
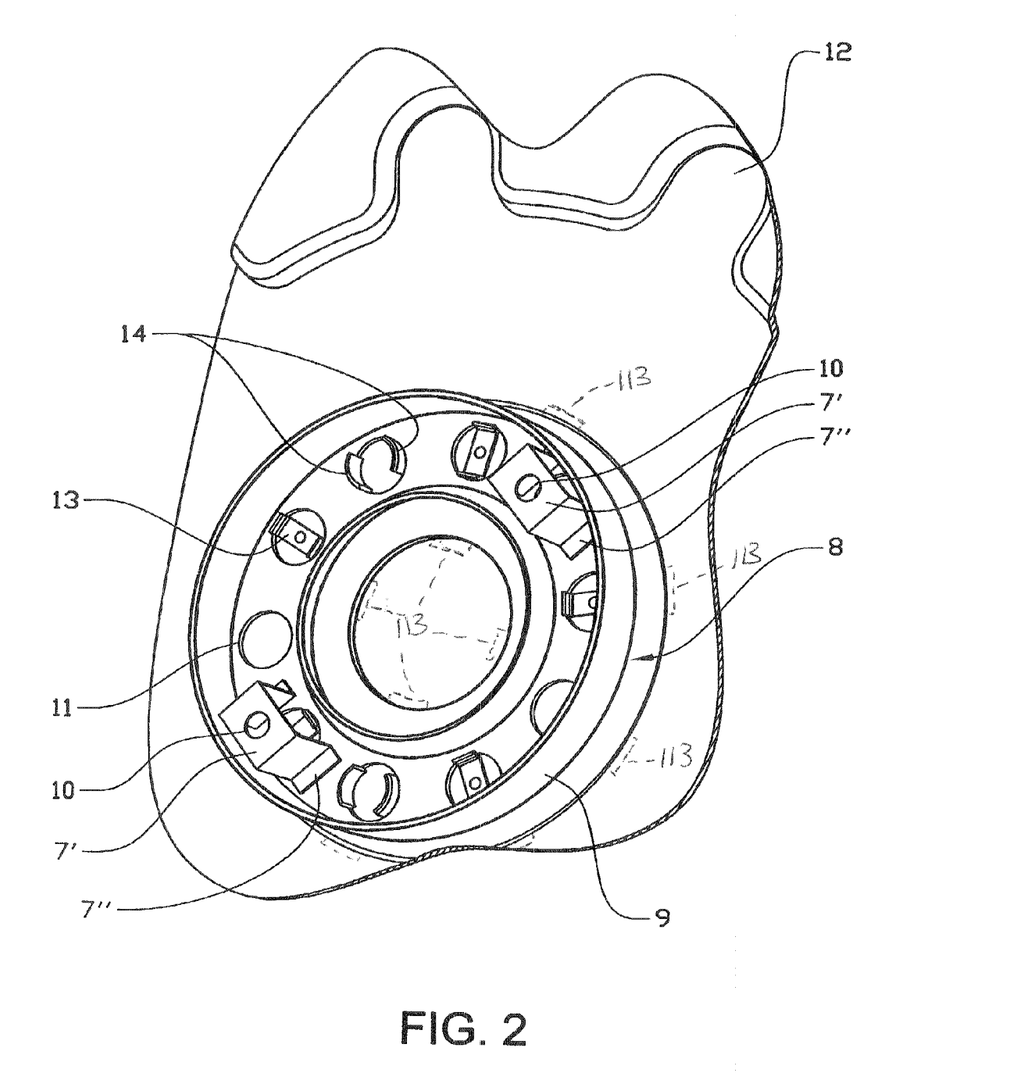
FIG. 2 shows a holder and the wheel cap according to the embodiment of the invention in FIG. 1A, viewed from the rear.

FIG. 2 shows a view of the holder 6 according to FIG. 1, with the wheel cap 12 fitted. As will be seen from the figure, the attachments 7 are fitted to the inner surface 8' of the annular disc 8 by spot-welding. The attachments can naturally be fitted by means of rivets, screws, or the like. The figure also shows how the wheel cap 12 is held fast to the holder 6 by means of five clips 13, which have been inserted through holes in the annular disc 8 in order to be locked against the inner surface 8' of the disc facing the rim. According to the embodiment shown each clip 13 is mounted radially in its longitudinal direction, in order to interact with the corresponding radially inner and outer edges of the respective hole 11 (see FIG. 3B). In addition the wheel cap 12 is provided with a number of guides 14 for interaction with the holes 11 in the annular disc 8 that have not been used by the clips 13. These guides 14 are preferably located in a tangential direction relative to each hole, in order to interact with the corresponding edges of the holes.

The guides help to guide the clip correctly in toward the respective hole when mounting the wheel cap. The guides preferably comprise bent plates having a first end fixed to the wheel cap and a second end arranged at right angles to the plane of the annular disc 8 adjoining the respective hole. The guides can be fastened in the same way as the clips.

It is naturally possible to orient the respective guides in other directions, for example at right-angles to the placement shown in FIG. 2. Alternatively, the guides may be replaced entirely by clips, these being suitably oriented radially and tangentially by turns, as a substitute for the locating function of the guide when mounting the wheel cap.

Figure 3A:
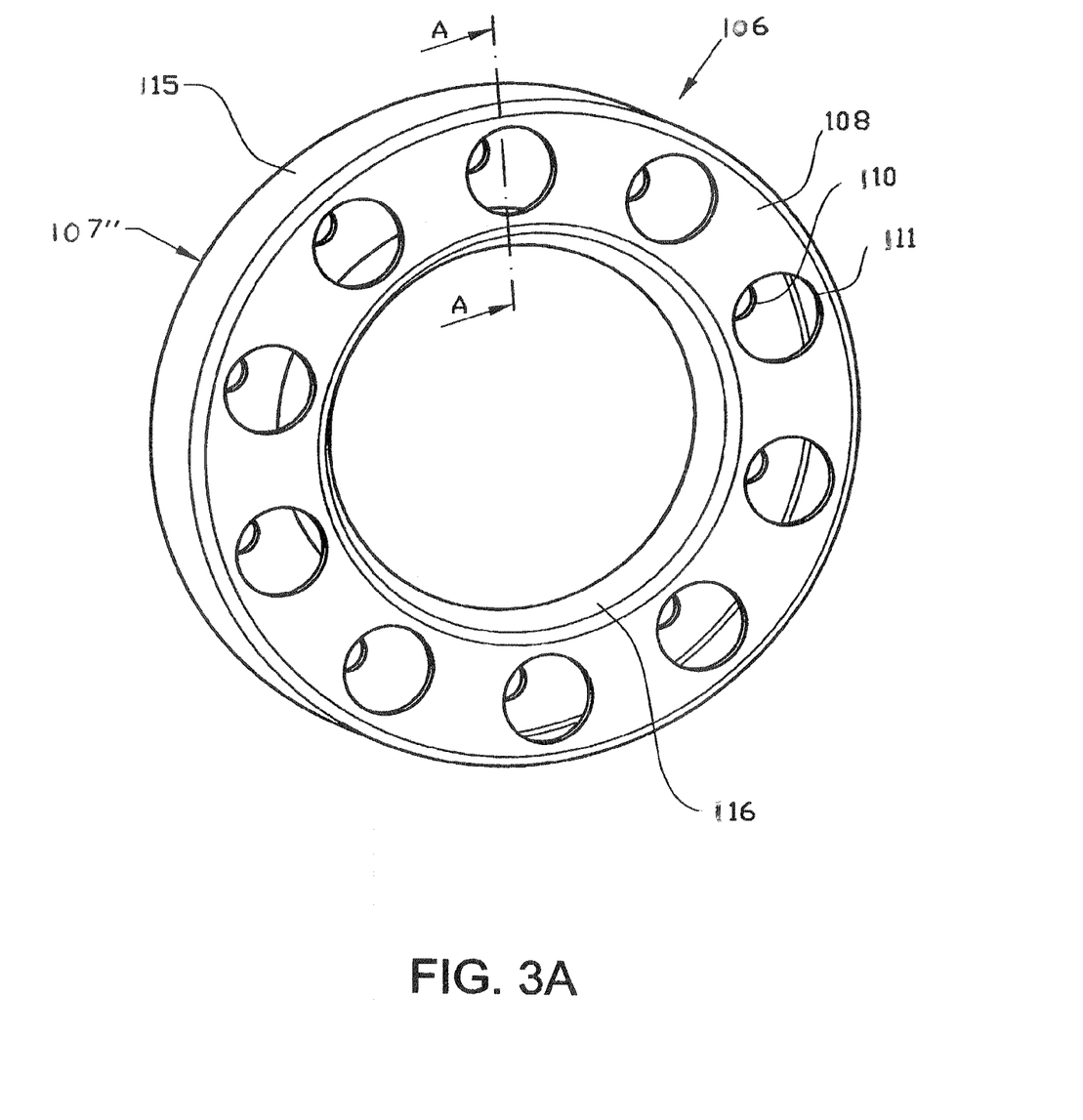
FIG. 3A shows a holder and the wheel cap according to a first alternative embodiment of the invention.

FIG. 3A shows an alternative embodiment of the holder 6, as described in connection with FIG. 1. The holder 106 of FIG. 3A comprises a first contact surface in the form of a first annular disc 107, for resting against the rim 3, a second annular disc 108, located at an axial distance from the first annular disc 107", and a cylindrical section 115, which joins the respective first and second annular discs 107", 108 together along the radially outer periphery of the respective disc. The first annular disc 107" is provided with a number of first holes 110, preferably corresponding to the wheel bolts 5 in number and diameter, for fastening the holder 106 to the rim 3. The second annular disc 108 is provided with a number of second holes 111, located concentrically with the first holes 110. The number of second holes 111 corresponds to the number of wheel bolts 5, but the holes have a larger diameter in order to allow access to the wheel bolts 5 with a box spanner or similar tool. The inner peripheral 116 of the second annular disc 108 has been angled axially inwards in relation to the wheel axis X in order to afford further protection for the wheel bolts.

Figure 3B:
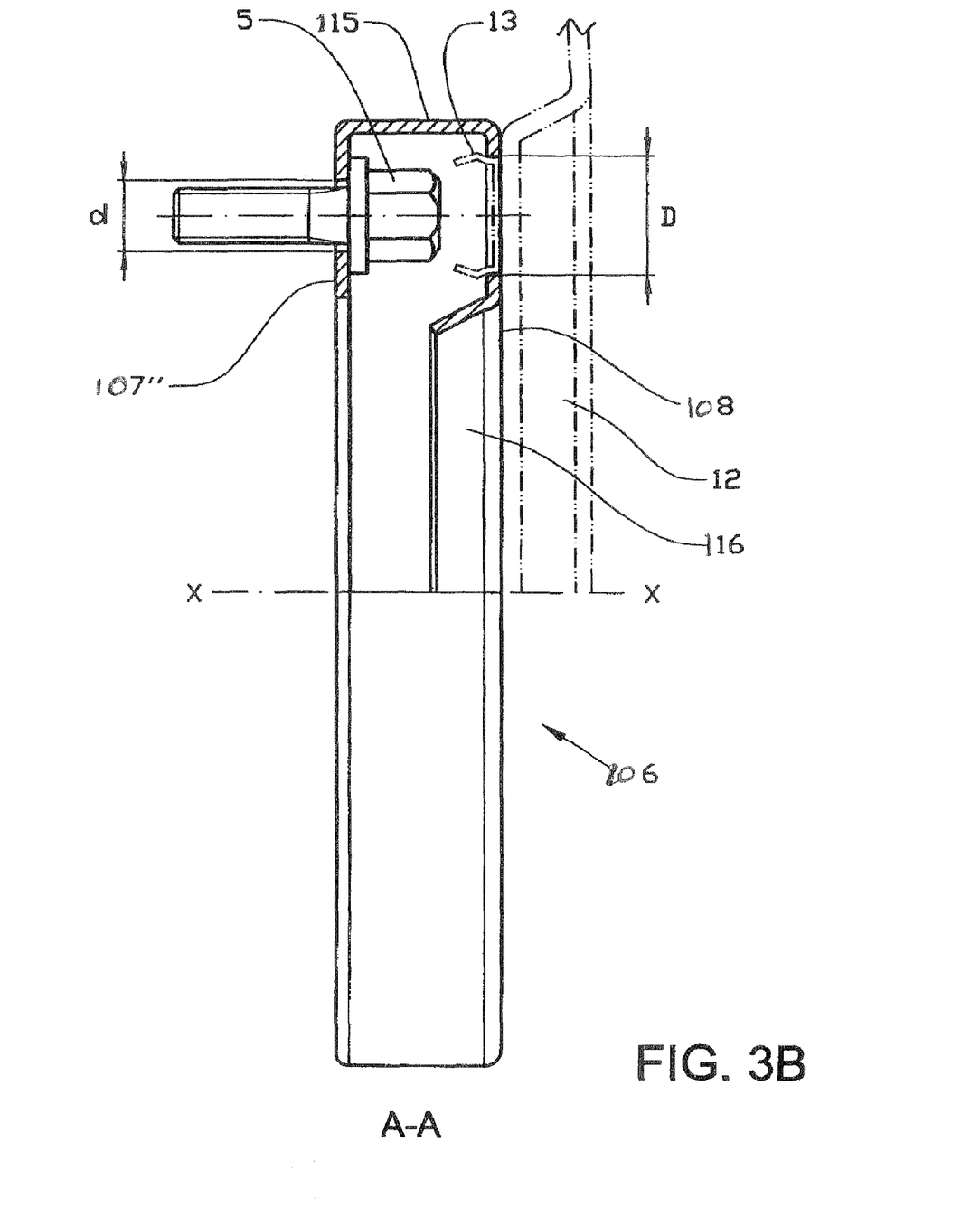
FIG. 3B shows a cross section through the holder and the wheel cap in FIG. 3A.

FIG. 3B shows a section A-A through the holder in FIG. 3A. In FIG. 3B a wheel bolt 5 has been indicated by dashed lines, the diameter d of a first hole 110 in the first annular disc 7"107" being somewhat greater than the diameter of the threaded section of the wheel bolt 5. The second annular disc 108 has a second hole 111 of a diameter D that allows a box spanner or the like to be inserted for fitting/removal of the wheel bolt. The hole 111 also forms an attachment for a clip 13 on the wheel cap 12, which is indicated by a dot-and-dash line. According to this embodiment the clip comprises a sheet metal plate that is fastened to the wheel cap along its central section, the two outer sections thereof being bent out from the wheel cap. These outer sections are bent so that the largest distance between the ends is greater than the diameter D of the second holes 111 in the holder. When the wheel cap 12 is mounted a pair of angled ends of the clip 13 will come into contact with a second hole 111 in the holder 106, the ends in a first step being pressed toward one another before snapping back a short distance and locking the wheel cap 12 against the holder 106.

Figure 4A:
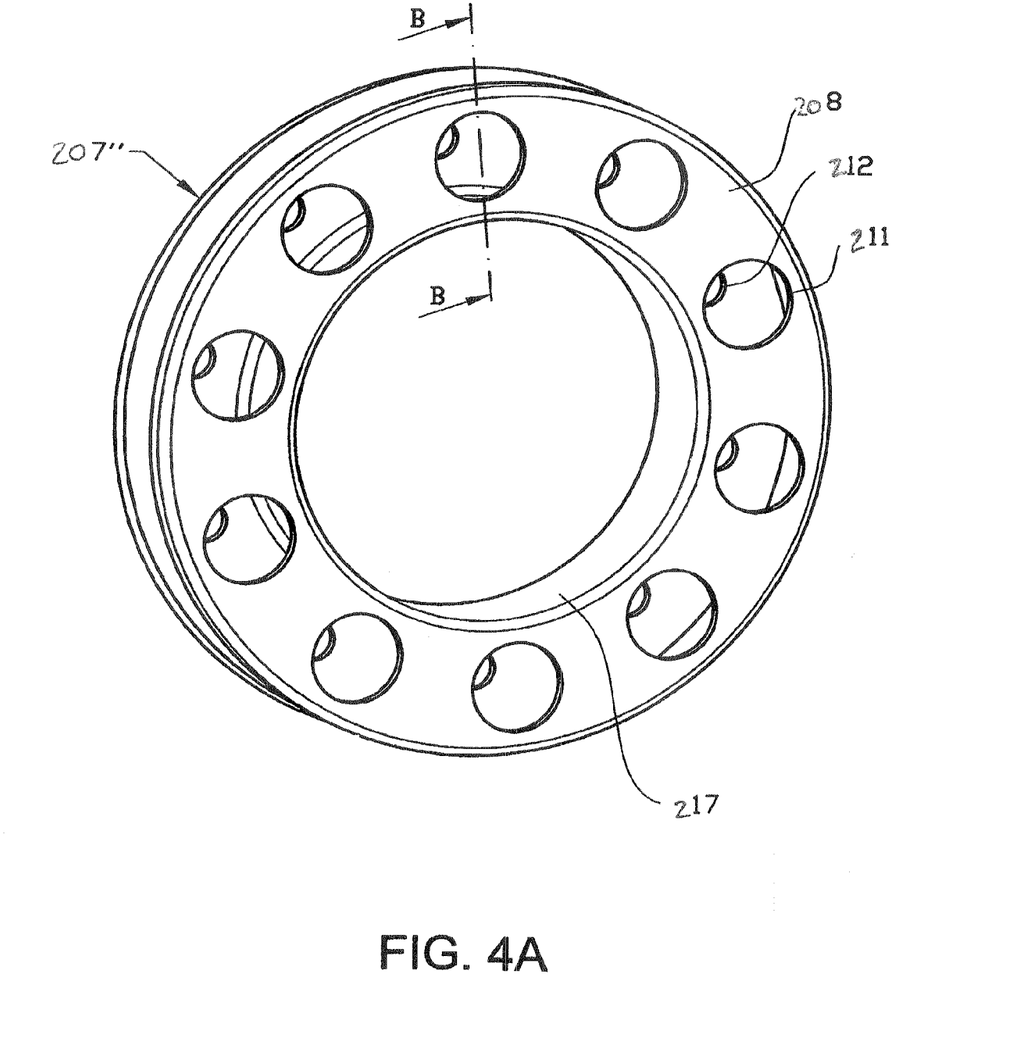
FIG. 4A shows a holder and the wheel cap according to a second alternative embodiment of the invention.
Figure 4B:
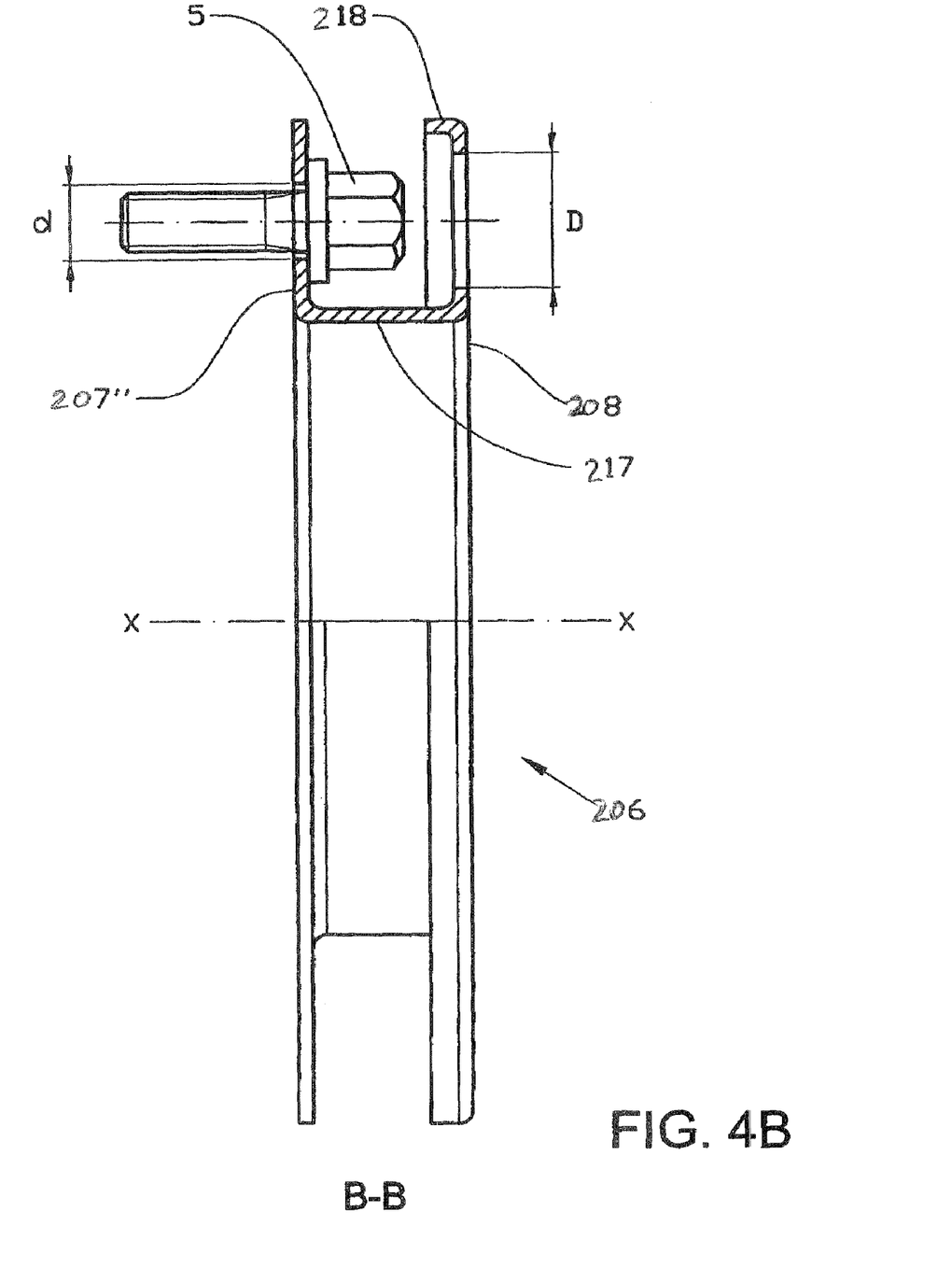
FIG. 4B shows a cross section through the holder and the wheel cap in FIG. 4A.

FIG. 4A shows an alternative embodiment of the holder shown in FIG. 3A. The holder 206 comprises a first contact surface in the form of a first annular disc 207", for resting against the rim 3, a second annular disc 208, located at an axial distance from the first annular disc 207", and a cylindrical section 217 which joins the respective first and second annular discs 207", 208 together along the radially inner periphery of the respective disc. The outer peripheral edge 218 of the second annular disc 208 has been angled axially inwards in relation to the wheel axis X in order to afford further protection for the wheel bolts. FIG. 4B shows a section B-B through the holder 206 in FIG. 4A. In FIG. 4B a wheel bolt 5 has been indicated by dashed lines, the diameter d of a first hole 210 in the first annular disc 107" being somewhat greater than the diameter of the threaded section of the wheel bolt 5. The second annular disc 208 has a second hole 211 of a diameter D that allows a box spanner or the like to be inserted for fitting/removal of the wheel bolt. The hole 211 also forms an attachment for a clip 13 on the wheel cap 12, as described above.

In FIGS. 3A and 4A the holder has been described as a component manufactured in one piece, but it is naturally possible to manufacture each holder in two or more parts which are suitably joined in order to form one component. The reason for this may be that an assembled holder is easier and/or less expensive to manufacture for production engineering reasons.

The examples above describe only one type of clip, the two tongues of which are designed to interact with diametrically opposing edges in a preferably circular opening. Alternative embodiments may comprise clips 113 (shown in phantom in FIG. 2) having only one tongue, which snaps around a radially inner or outer edge of two or more openings, or around a radially inner or outer peripheral edge of the second contact surface of the holder.

The exemplary embodiments above are primarily intended for heavier vehicles, such as trucks and buses, but can also be applied to light trucks, automobiles and other types of vehicle with exposed wheel bolts or wheel nuts.

In the present application, the use of terms such as "including" is open-ended and is intended to have the same meaning as terms such as "comprising" and not preclude the presence of other structure, material, or acts. Similarly, though the use of terms such as "can" or "may" is intended to be open-ended and to reflect that structure, material, or acts are not necessary, the failure to use such terms is not intended to reflect that structure, material, or acts are essential. To the extent that structure, material, or acts are presently considered to be essential, they are identified as such.

The invention must therefore not be regarded as being limited to the exemplary embodiments described above, a number of further variants and modifications being feasible without departing from the scope of the following claims.

The invention claimed is:

1. A method for mounting a wheel cap on a vehicle, the vehicle having rims with exposed fasteners for fastening to a wheel hub, the method comprising:

mounting a holder with fasteners of the rim, the holder having a first contact surface for resting against the rim and a second contact surface lying substantially parallel to and at a distance from the first contact surface, the holder being mounted by at least two fasteners of the rims interacting with openings in the first contact surface of the holder; and mounting the wheel cap on the holder by a plurality of clips on an inner side of the wheel cap interacting with openings for the fasteners of the rim in the second contact surface of the holder, wherein the inner side of the wheel cap is provided with a plurality of guides, and causing the guides to interact with openings in the second contact surface of the holder.

2. The method as claimed in claim 1, comprising mounting the wheel cap such that a plurality of second clips on the inner side of the wheel cap interact with an inner or outer peripheral edge on the second contact surface of the holder.

3. The method as claimed in claim 2, wherein the wheel cap is provided with an outer peripheral edge having an inner side that contacts an outer peripheral edge of the holder.

4. The method as claimed in claim 1, wherein the wheel cap is provided with an outer peripheral edge having an inner side that contacts an outer peripheral edge of the holder.

5. An arrangement for mounting a wheel cap on a vehicle, the arrangement comprising:

a rim mounted on a wheel hub with a plurality of rim fasteners;

a holder; and a wheel cap, wherein the holder comprises a first contact surface which rests against the rim and is fastened thereto with at least two rim fasteners that interact with openings in the first contact surface of the holder, and a second contact surface lying in a plane substantially parallel to and at a distance from the first contact surface, the wheel cap being mounted to the second contact surface with a plurality of clips on the inner side of the wheel cap that interact with openings for the fasteners of the rims in the second contact surface of the holder, wherein the inner side of the wheel cap is provided with a plurality of guides adapted to interact with the openings.

6. The arrangement as claimed in claim 5, wherein the wheel cap is provided with an outer peripheral edge having an inner side adapted to rest against an outer peripheral edge of the holder.

7. The arrangement as claimed in claim 5, wherein the wheel cap is provided with an outer peripheral edge having an inner side adapted to rest against an outer peripheral edge of the holder.

8. An arrangement for mounting a wheel cap on a vehicle, the arrangement comprising:

a rim mounted on a wheel hub with a plurality of rim fasteners;

a holder; and a wheel cap, wherein the holder comprises a first contact surface which rests against the rim and is fastened thereto with at least two rim fasteners that interact with openings in the first contact surface of the holder, and a second contact surface lying in a plane substantially parallel to and at a distance from the first contact surface, the wheel cap being mounted to the second contact surface with a plurality of clips on the inner side of the wheel cap that interact with openings for the fasteners of the rims in the second contact surface of the holder, wherein the wheel cap is provided with a plurality of second clips that are detatchably fastened to an inner or outer peripheral edge of the second contact surface of the holder.

9. The arrangement as claimed in claim 8, wherein the wheel cap is provided with an outer peripheral edge having an inner side adapted to rest against an outer peripheral edge of the holder.

10. The arrangement as claimed in claim 9, wherein the inner side of the wheel cap is provided with a plurality of guides adapted to interact with the openings.

11. The arrangement as claimed in claim 8, wherein the inner side of the wheel cap is provided with a plurality of guides adapted to interact with the openings.

* * * * *